July 2, 1940.                G. H. PHELPS                2,206,426
                           ELECTRIC RIVETING
                         Filed Feb. 25, 1938              5 Sheets-Sheet 1
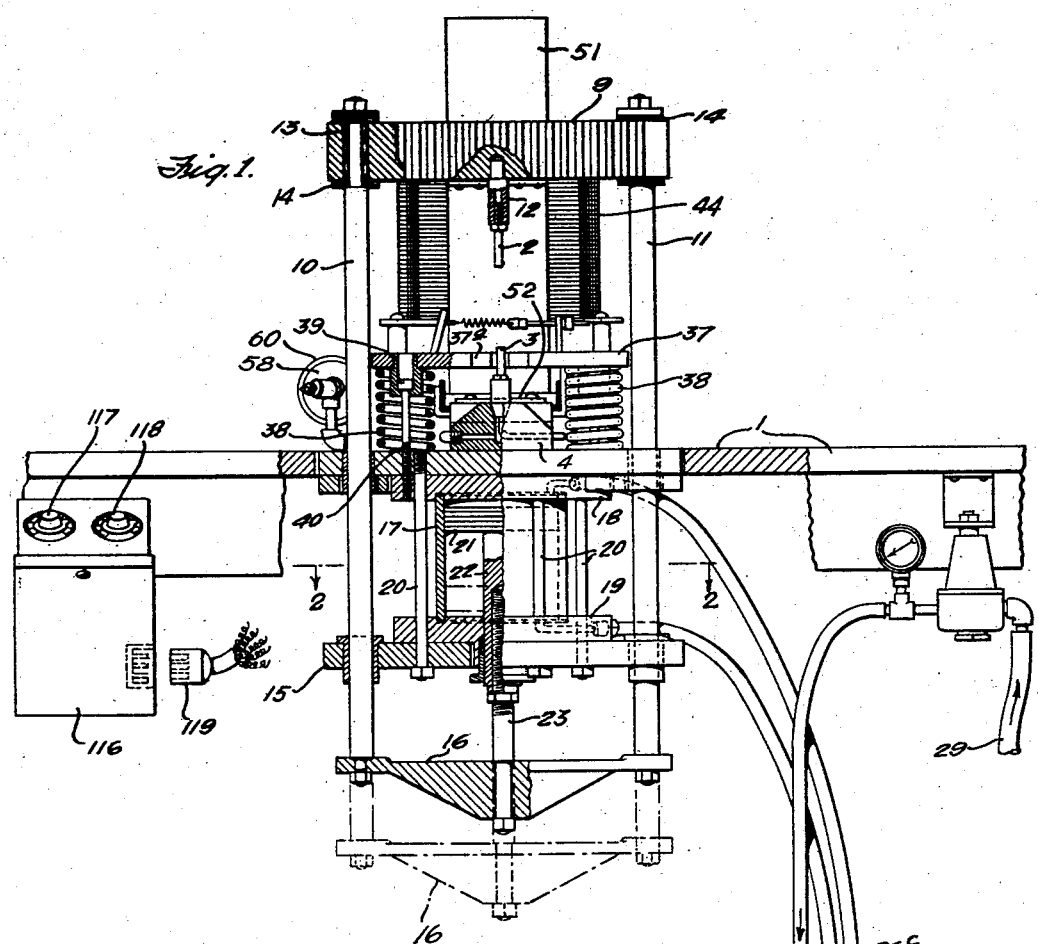
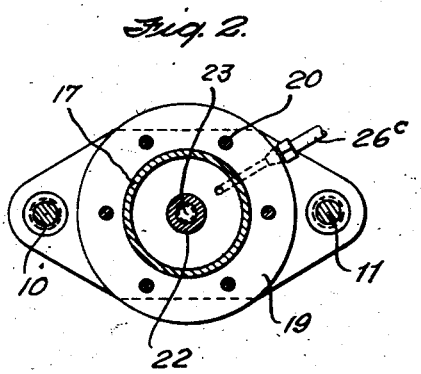
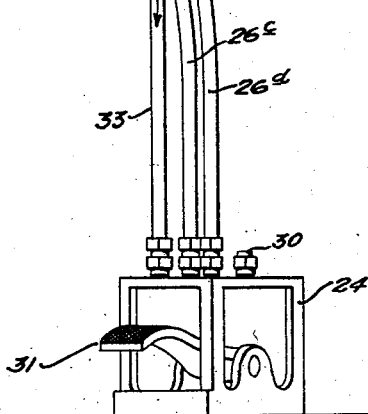
INVENTOR
GEORGE H. PHELPS
BY
George T. Gill
ATTORNEY

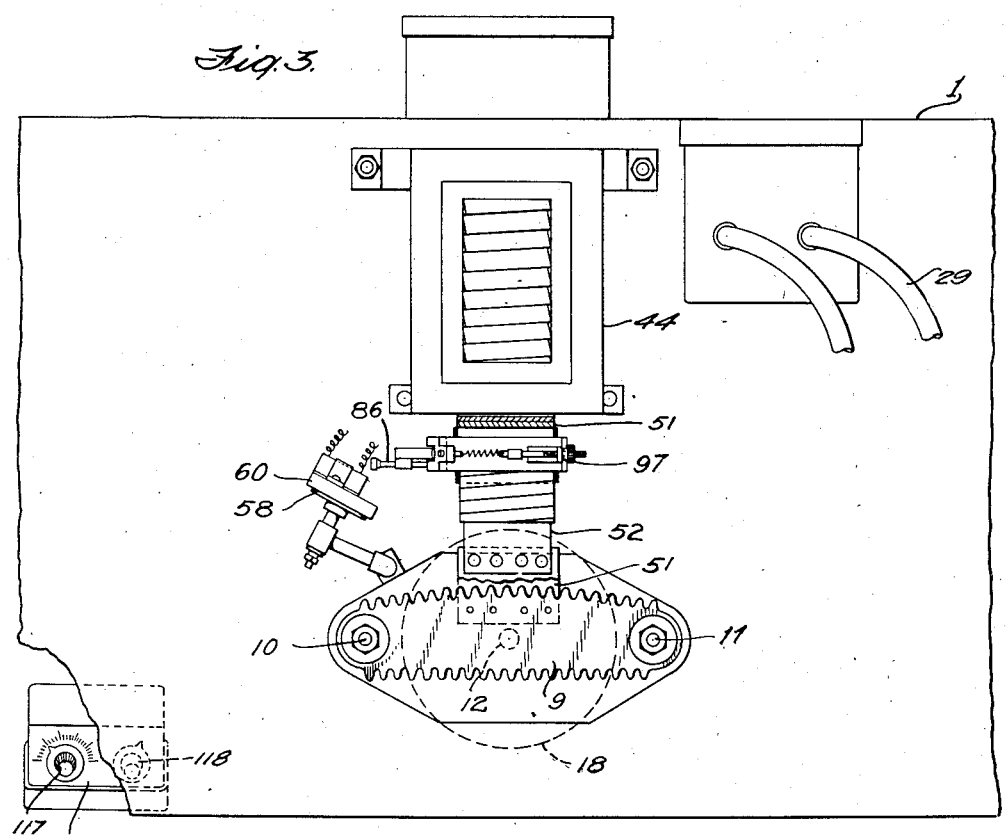
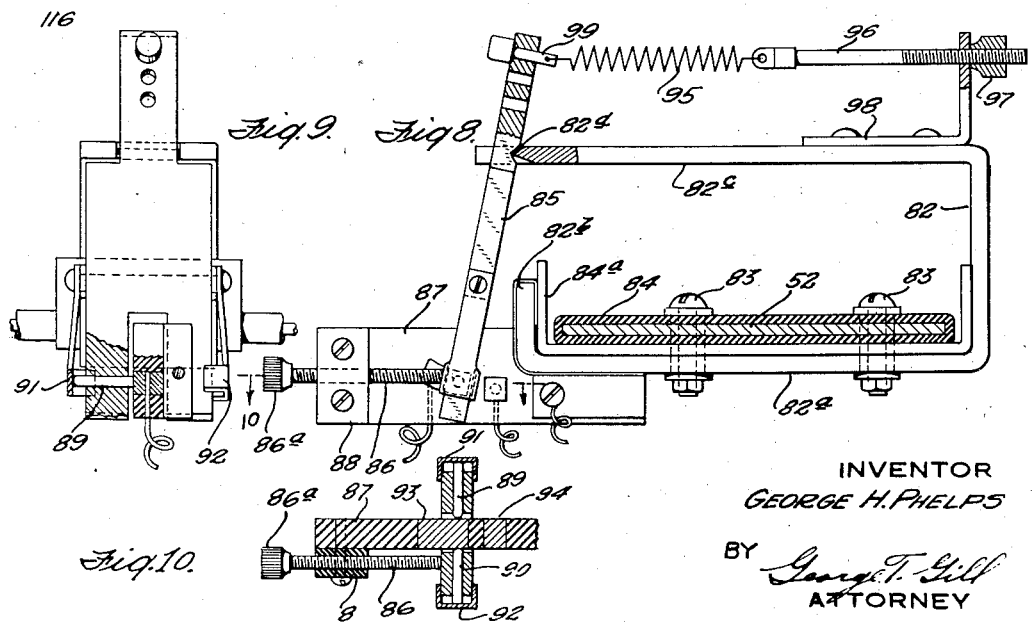

July 2, 1940.  G. H. PHELPS  2,206,426
ELECTRIC RIVETING
Filed Feb. 25, 1938  5 Sheets-Sheet 3
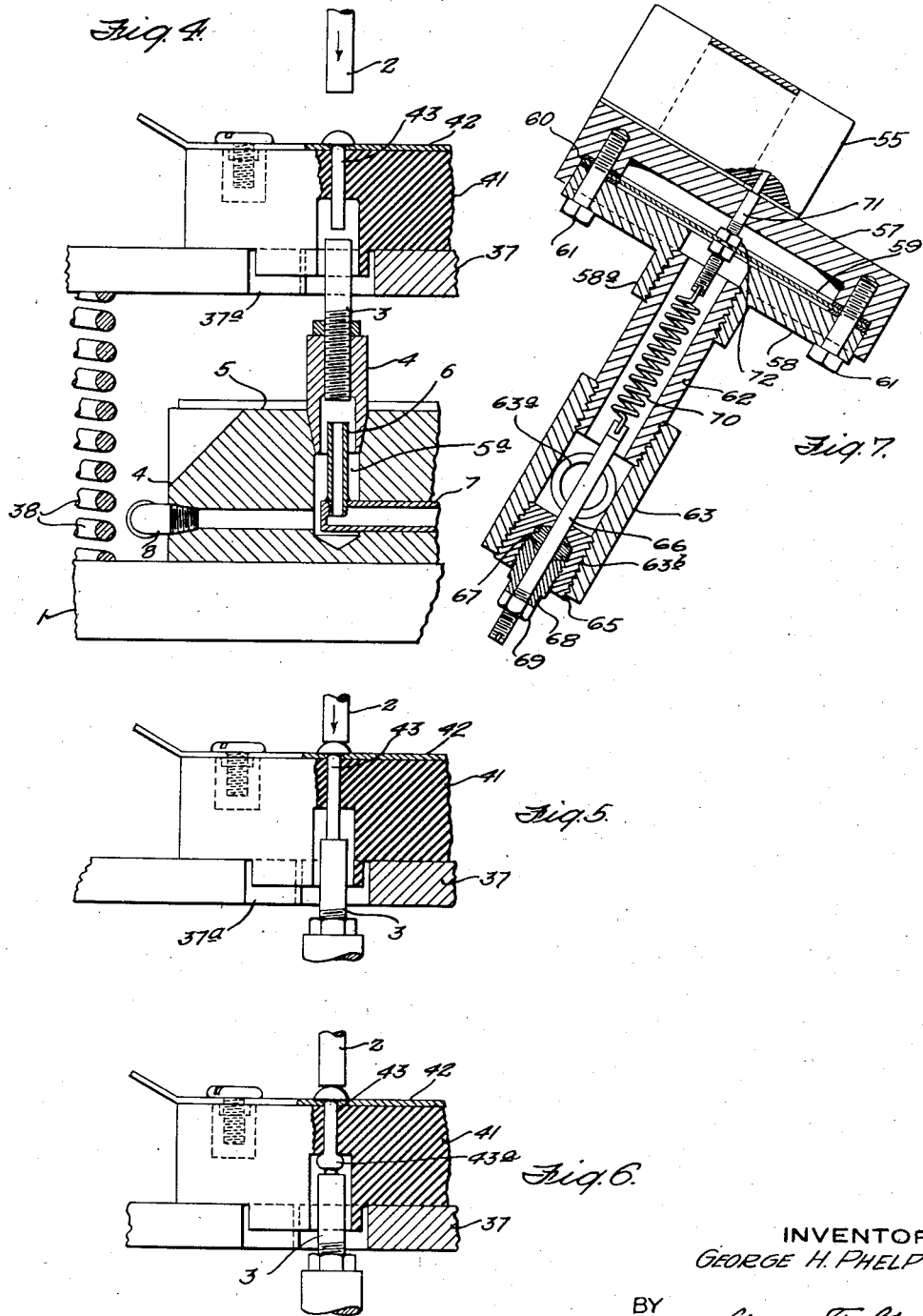
INVENTOR
GEORGE H. PHELPS
BY
George T. Gill
ATTORNEY

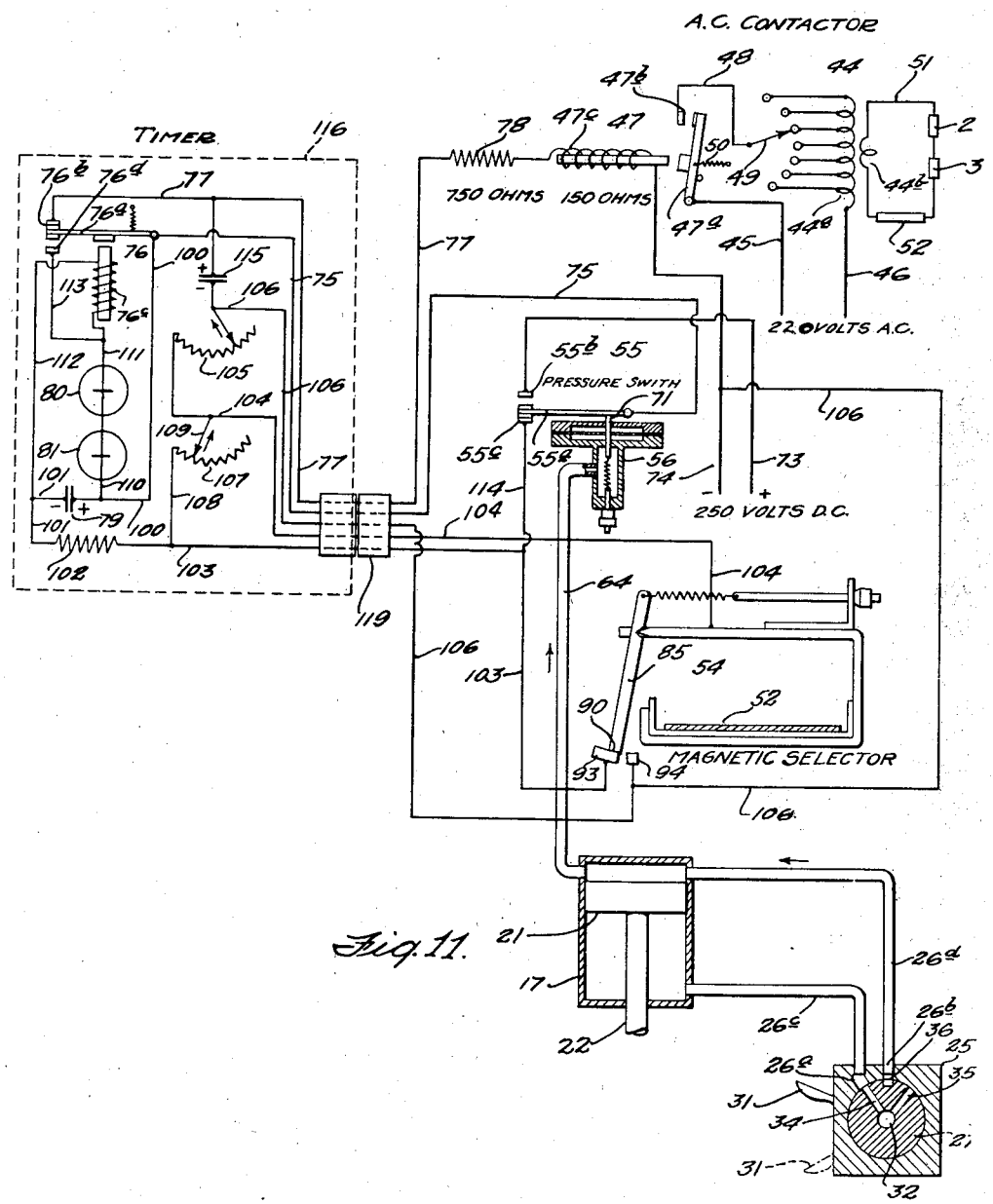

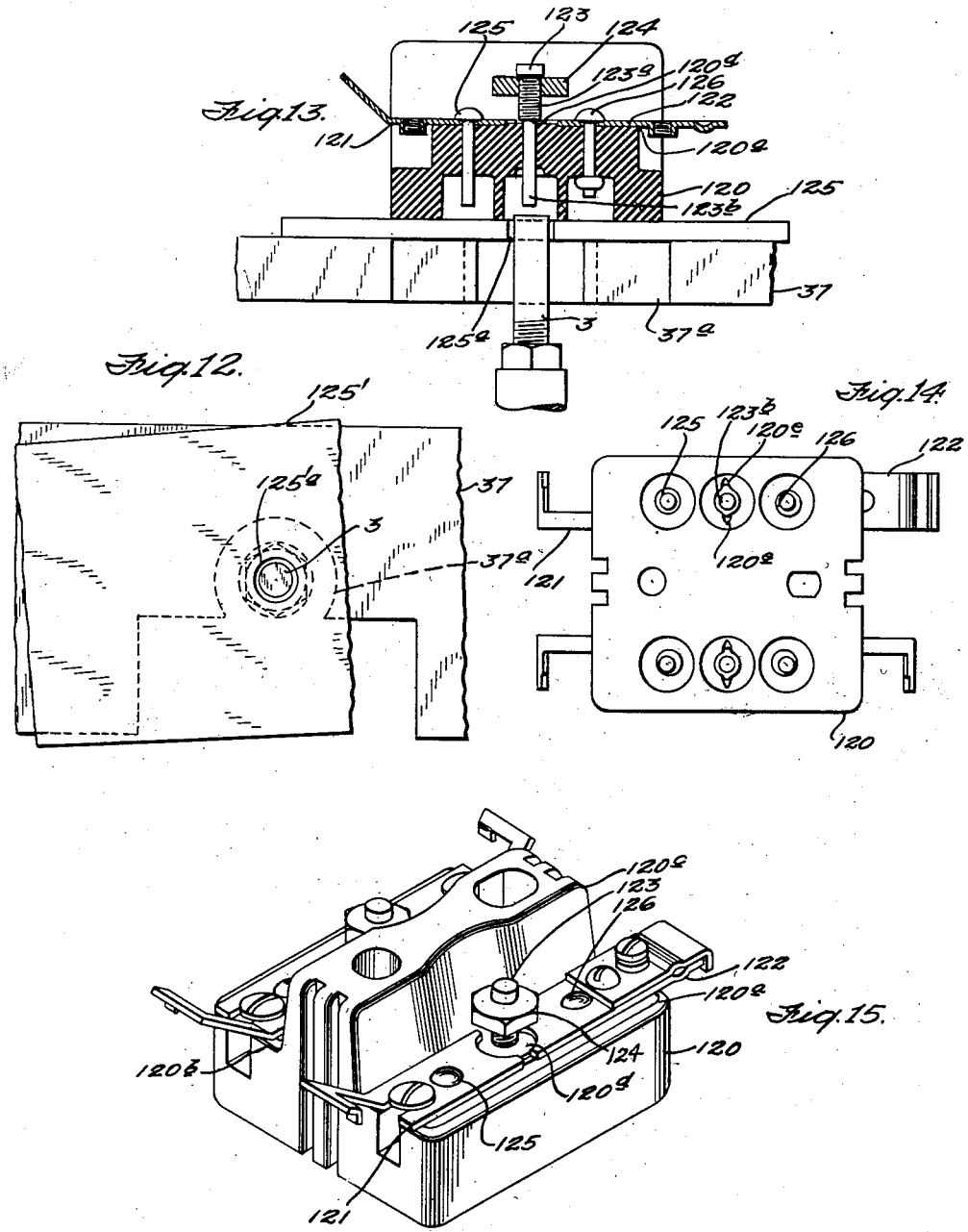

Patented July 2, 1940

2,206,426

UNITED STATES PATENT OFFICE 2,206,426

ELECTRIC RIVETING

George H. Phelps, Floral Park, N. Y., assignor to Metropolitan Device Corporation, a corporation of New York Application February 25, 1938, Serial No. 192,454

4 Claims. (Cl. 219—2)

The invention herein disclosed relates to heading rivets and includes a machine for this purpose which, while not limited thereto, is particularly suitable for riveting parts to a frangible base.

Commonly, solid rivets have heretofore been headed by striking the end of the heated rivet. The blows on the end of the rivet upset the metal and form a head on the rivet. This formed head together with the preformed head on the opposite end of the rivet secures together the parts through which the rivets pass.

The heading of rivets in this manner is not particularly suitable where the rivet is used to secure parts to a frangible base, as, for example, in assembling switches, fuse blocks and other electrical accessories in which the parts are secured to bases of insulating material such as porcelain. In such cases, even slight blows may fracture or break the base to which the parts are secured and it is an object of this invention to provide a way in which parts may be riveted to a frangible base without danger of breaking or fracturing the base and also a machine for performing such work.

In accordance with the invention rivets are headed by pressure. A rivet is placed through openings in the parts to be secured thereby and subjected to pressure. When the pressure on the ends of the rivets reaches a predetermined value, the rivet is subjected to heat and its temperature raised to the point where its compressive strength will no longer support the load. At this point upsetting of the rivet begins and continues until the heating is interrupted which takes place when the end of the rivet is headed and the rivet clamps the parts together. Heading of rivets in this manner is accomplished by the machine of this invention which includes means for exerting pressure on the ends of the rivet and means for heating the rivet for a predetermined time interval determined by the nature of the metal of the rivet.

Such a machine constructed in accordance with this invention is illustrated in the accompanying drawings in which:

Figs. 1 to 3 illustrate the assembled machine, Fig. 1 being a front elevation, partly in section, Fig. 2 being a transverse section taken on line 2—2 of Fig. 1, and Fig. 3 being a plan with parts broken away to show parts lower in the machine;

Figs. 4 to 6 illustrate several positions of the mechanical parts that engage the ends of a rivet; Fig. 4 is a fragmentary, sectional elevation illustrating the parts out of contact with a rivet, Fig. 5 is a similar section illustrating the parts in contact with the ends of a rivet, and Fig. 6 is likewise a similar section showing the parts after the upsetting of the rivet.

Figs. 7 to 10 illustrate certain parts of the machine, Fig. 7 being a longitudinal section of the pressure operated mechanism of a pressure actuated switch, and Figs. 8, 9 and 10 being respectively a side elevation, an end elevation (both partly in section) and a transverse section (taken on the line 10—10 of Fig. 8) of a relay mechanism;

Fig. 11 is a wiring diagram illustrating the electrical circuits and equipment forming a part of the machine;

Figs. 12 and 13 illustrate the manner in which some devices are mounted on the machine for having parts thereof riveted together, Fig. 12 being a fragmentary plan of the plate of the machine, and Fig. 13 being a fragmentary section illustrating a connector block with rivets therethrough on the machine;

Figs. 14 and 15 illustrate, by way of example, some work that may be done on the machine; Fig. 14 is a bottom plan of an electrical connector block, and Fig. 15 is an isometric of the same.

The machine together with the associated mechanism, with the exception of a foot control, is mounted upon a table frame 1. For the purpose of exerting pressure on the ends of a rivet, there are provided two opposed and aligned rods 2 and 3, the ends of which engage the ends of a rivet to be headed. The lower rod 3 is stationary, being mounted upon the table frame 1, and the upper rod 2 is movable. This latter rod is moved into contact with a rivet between the two rods, and thereafter, while further movement is resisted by the rod 3, a compressive force is exerted on the rivet through the medium of the rod 2. This movement and the application of a compressive force to the rivet is effected through a fluid operated mechanism.

One end of the rod 3, which extends vertically, is threaded into the end of a hollow boss 4 that extends vertically from a block 5. The block 5 is mounted on the table frame 1 and has a vertical recess 5a therein in which the end of the hollow boss 4 is received and secured. Within the recess 5a there is a jet 6 that extends into the end of the boss 4 and that is directed toward the end of the rod 2. This jet extends laterally from a conduit 7 that passes through the block and into the recess 5a. The external diameter of the jet is less than the internal diameter of the recess 5a and an annular passage is thus formed for the cooling water that enters through the conduit 7 and that is ejected against the end of the rod 3 within the boss 4. This annular passage is connected to a conduit 8 through which the water is carried to waste.

The rod 2 is mounted on a cross-head 9 that extends between and is secured to two vertical rods 10 and 11. This rod 2 is likewise threaded into the hollow end of a boss 12 that is received and secured in a recess in the cross-head. The rods 10 and 11 are electrically insulated from the cross-head 9 by flanged bushings 13 and 14 in the openings in the cross-head through which the ends of the rods extend. These rods extend through and are slidably mounted in the table frame 1 and a guide plate 15 below and spaced from the table frame 1. A cross-head 16 extends between and is secured to the lower ends of the rods 10 and 11. It is through this cross-head that the rods are moved to bring the rod 2 into contact with the end of a rivet.

The fluid operated mechanism for moving the rod 2 and applying a compressive force on a rivet is mounted beneath the table frame 1. It consists of a cylinder 17 mounted between plates 18 and 19 constituting cylinder heads. The plate 18 is backed against the lower surface of the table frame 1 and has an annular groove in which the upper edge of the cylinder 17 is received. The plate 19 is against the guide plate 15 and it has an annular groove in which the lower end of the cylinder is received. The whole is secured together and the guide plate secured in place by bolts 20 extending through the guide plate and threaded into the table frame 1, and tightly securing the several parts together as well as supporting the guide plate and the cylinder. Within the cylinder there is a piston 21 from which a piston rod 22 extends. The piston rod 22 extends through the cylinder head 19 and the guide plate 15 and by means of a connecting rod 23, it is connected to the cross-head 16. Ports, for the admission and exhaust of air under pressure, are provided in the cylinder heads 18 and 19.

The admission of air under pressure to and the exhaust of air from the cylinder 17 is controlled by a valve 24 mounted on the floor. This valve, the details of which are shown diagrammatically in Figure 11, consists of a case 25 having ports 26a and 26b therethrough. A rotary valve 27 within the case controls communication between the air under pressure, represented by a flexible conduit 29 (see Figure 1), and the ports in the cylinder heads and communication between these latter ports and the atmosphere through a vent 30. The rotary valve is movable in one direction by a foot pedal 31 and in the other direction by a spring (not shown). The valve has an axial passage 32 that is connected through flexible conduit 33 (see Figure 1) to the air supply. With this passage two radial passages 34 and 35, angularly displaced, communicate. A passage 36 in the periphery of the valve communicates with the atmosphere through the vent 30. The ports 26a and 26b are respectively connected, through flexible conduits 26c and 26d respectively, to the ports in the cylinder heads 19 and 18. Thus, when the pedal 31 is raised, the passage 34 in the valve communicates with the port 26a and air under pressure is delivered to the lower end of the cylinder 17. In this same position, the port 26b communicates with the passage 36 and the upper part of the cylinder is connected to the atmosphere. The piston is thus raised in the cylinder and the rods 2 and 3 are in the position shown in Figures 1 and 4. When the pedal 31 is pressed, the valve 27 is rotated so that the passage 35 registers with the port 26b and the passage 36 registers with the port 26a. In this position of the valve, air under pressure is delivered to the upper end of the cylinder and the lower end of the cylinder is connected to the atmosphere.

Intermediate the cross-head 9 and the table frame 1, there is a work-support plate 37 on which the parts to be riveted together are placed. This plate is mounted on heavy springs 38 that rest on the table frame 1 and it is positioned such that the rod 3 normally extends through an opening 37a through the plate, particularly when the machine is used for the type of work hereinafter described. Within each spring 38, there is a cup-shaped element 39 that is secured in an opening in the plate 37 and extends downwardly from the plate. A bolt 40 extends through the bottom of this cup-shaped element and it is threaded into the frame plate 1. Contact between the heads of the bolts 40 and the bottom of the cup-shaped elements 39 serves to limit the upward movement of the plate 37 under the action of the springs 38.

In use, the parts to be riveted together (see Figures 4 to 6) are placed on the plate 37, the parts being positioned with respect to each other and a rivet inserted in the aligned openings. As shown in Figure 4, a contactor block 41 is positioned on the plate 37. A contact strip 42 is to be riveted to the block and the rivet 43 extends through aligned openings in the strip and block. When the block is positioned with the rivet 43 aligned with the rods 2 and 3 the operator presses the foot pedal 31. This, as heretofore explained, causes the piston 21 to move downwardly in the cylinder and through the rods 10 and 11 and the cross-head 9 carries the rod 2 towards the rod 3. When the rod 2 engages the formed head on the rivet 43, it continues to move downwardly compressing the springs 38 until the unheaded end of the rivet engages the rod 3. The pressure of the springs 38 serves to clamp the strip 42 in contact with the block 41 while the heading of the rivet takes place.

When the rivet 43 engages the rod 3, as shown in Figure 4, further movement of the rod 2 is resisted and pressure is built up in the cylinder 17 behind the piston. This pressure is translated into a compressive force on the rivet and when this force attains a predetermined value, the rivet is heated for a definite predetermined time period. The extent to which the rivet is heated is such that it is upset under the compressive force on the rivet, and a head 43a is formed thereon as shown in Figure 6.

This heating of the rivet is effected by passing an electric current through the rivet. For this purpose there is provided a transformer 44 having a tapped primary 44a and a single turn secondary 44b. In a machine for riveting the parts of a fuse block, connector block and the like to porcelain bases, this transformer, which may be supplied from a 220 volt A. C. supply represented by line wires 45 and 46, is preferably one having eighty turns on the primary tapped at intervals of five turns, the last tap being at forty turns. In such case, the secondary has a single turn of one-quarter inch by four inch bus bar. In the arrangement shown diagrammatically in Figure 11, one of the supply wires 46 is connected to one side of the primary 44a. The other supply wire 45 is connected to the armature 47a of a normally open, single-pole, single-throw, electromagnetically operated switch 47. The armature 47a cooperates with a contact 47b which is connected by a wire 48 to the movable arm 49 that engages the several contacts of the transformer primary. A spring 50 normally maintains the armature 47a away from the contact 47b. The force of the spring is overcome and the circuit to the primary of the transformer closed upon energization of the coil 47c of the switch 47.

The secondary of the transformer extends to the rods 2 and 3, one side of the secondary being connected to the rod 2 by a heavy flexible lead 51 and the other side being connected to the rod 3 by a bus 52 that passes through a magnetic selector 54 hereinafter more particularly described. Thus, when the rods 2 and 3 engage the ends of a rivet the secondary circuit of the transformer is closed and the rivet forms a part of that circuit. Upon the subsequent closing of the primary circuit current flows through the rivet and effects the heating of the rivet.

Energization of the coil 47c of the electromagnetic switch 47, and therefore energization of the transformer primary, is determined by the pressure in the cylinder 17 above the piston 21. When this pressure reaches a predetermined value, and in consequence when a predetermined compressive force is applied to the rivet, a circuit to the coil 47c is closed by a pressure actuated switch 55. The switch may be of any well known type and it is represented diagrammatically in Figure 11 as a pivotally mounted arm 55a operating between two contacts 55b and 55c. Normally, that is, when there is no pressure in the upper part of the cylinder 17, or when the pressure is insufficient to actuate the switch, the switch arm 55a makes contact with the contact 55c. The switch is operated to move the arm into contact with the contact 55b by a pressure diaphragm device 56, illustrated diagrammatically in Fig. 11 and in detail in Fig. 7.

This device consists of a circular case 57 having a cover 58 that abuts against a shoulder formed on the case. Between the shoulder and the cover, a flexible diaphragm 59 is clamped between circular gaskets 60, one on each side of the diaphragm at the edge thereof, the gaskets and the edge of the diaphragm being clamped between the shoulder on the case and the cover by bolts 61. On the cover, centrally thereof, there is formed an outwardly extending lateral boss 58a into which one end of a tube 62 is threaded. On the other end of the tube there is threaded a T-fitting 63, the side opening 63a of which is connected by a conduit 64 to a port in the cylinder head 18. In the opening 63b of the fitting 63, opposite to that into which the tube 62 is threaded, there is threaded a plug 65 bored to receive a rod 66 and recessed and threaded to receive a packing gland 67, the bushing 68 of which is likewise bored to receive the rod 66. The end of the rod 66 passing through the plug 65 is threaded and a nut 69 threaded thereon abuts against the end of the bushing 68. Inside the tube 62, the rod 66 is connected to one end of a spring 70, the other end of which spring is secured to one end of a rod 71 that passes through the diaphragm 59 and an opening in the wall of the case 57. The rod 71 is positioned with respect to the diaphragm by collars 72 secured on the rod, one on each side of the diaphragm. It will thus be seen that fluid under pressure entering through the conduit 64 from the cylinder 17 acts on the diaphragm 59 in opposition to the tension of the spring 70. When the pressure exceeds the tension of the spring, the diaphragm will flex, raise the rod 71 and so actuate the switch 55. The tension of the spring 70 may, of course, be adjusted through the nut 69.

The circuit closed (see Fig. 11) by actuation of the switch 55 through the pressure devices includes a source of direct current represented by the positive line wire 73 and the negative line wire 74. The positive line wire is connected directly to the contact 55b. The arm or blade 55a of the switch 55 is connected by a wire 75 to the arm or blade 76a of a double-throw, single-pole, electromagnetic switch 76. The arm 76a of the switch 76 is normally held in engagement with a contact 76b which is connected by a wire 77 to one side of the coil 47c of the electromagnetic switch 47, a fixed resistance 78 being interposed in series with the coil. The other side of the coil 47c is connected directly to the negative line wire 74.

This circuit to the coil 47c of the switch 47 is opened after the lapse of a predetermined time interval by energization of the coil 76c of the electromagnetic switch 76, which when energized moves the arm 76a away from the contact 76b and into engagement with a contact 76d. Energization of the coil 76c is effected through the discharge of a condenser 79 through a pair of neon tubes 80 and 81. Upon closing the circuit to the coil 47c of the switch 47, the condenser 79 begins to charge at a rate determined by the resistance of the charging circuit and when it has reached a potential of sufficient magnitude it discharges through the neon tubes to energize the coil 76c of the switch 76.

In the embodiment of the invention illustrated, there are two charging circuits for the condenser as this particular machine is designed for operating alternatively upon steel or brass rivets, both being used in securing parts of an electrical connector block, for example, to the porcelain base or together. Which circuit will be effective, and in consequence the time of heating of a rivet, is determined by the magnetic selector 52. This device is essentially an electromagnetic switch or relay of the single-pole, double-throw type. The particular magnetic selector illustrated (see Figs. 8, 9 and 10) consists of a metal yoke 82, one leg 82a of which has a lateral flange 82b. Through the channel formed by the web of the yoke, the leg 82a and the flange 82b, the bus 52 passes. It is secured to the leg 82a by bolts 83, being electrically insulated therefrom by insulating material 84 and received in a liner 84a for the channel. The end of the other leg 82c of the yoke is bifurcated and the edge 82d between the arms of the bifurcated end is brought to a knife edge. This edge forms a fulcrum for a lever 85 that is urged against an adjustable stop 86 mounted in a plate 87 of electrical insulating material secured to the yoke. The stop 86 is a screw having a knurled end 86a and threaded through a block 88 mounted on the plate 87. The end of the lever 85 is bifurcated and straddles the plate 87. Opposed contacts 89 and 90 slidably mounted in the arms of the bifurcated end of the lever and spring pressed by leaf springs 91 and 92 cooperate with contacts 93 and 94 embedded in the plate 87. The lever 85 is held against the stop and the contacts 89 and 90 in engagement with the contact 93 by a spring 95 that is secured at one end to a rod 96 extending through and positioned by a nut 97 with respect to a bracket 98 mounted on the leg 82c of the yoke. The other end of the spring is attached to a headed rod 99 extending through an opening in the upper end of the lever.

When a current of one intensity passes through the secondary circuit of the transformer, as, for example, when a steel rivet constitutes a part of the circuit, the magnetic force of the magnetic selector is insufficient to move the lever 85 against the force of the spring 95 and contact 90 remains in engagement with contact 93. When, however, a rivet of a different metal with lower electrical resistance, as for example, brass, constitutes a part of the secondary circuit, a greater current flows through the bus 52 and the lever 85 is moved against the action of the spring 95 and contact 90 is brought into engagement with contact 94. This changes the time interval during which current passes through the rivet by changing the resistance of the circuit through which the condenser 79 is charged.

Referring to Figure 11, it will be seen that upon the closing of the circuit to the coil 47c of the switch 47, there is established a circuit to the condenser 79. This circuit includes the wire 75, a wire 100 connected to wire 75 and one side of the condenser 79. A wire 101 is connected to the other side of the condenser and to one side of a fixed resistance 102. This resistance is connected by a wire 103 to the contact 93 of the magnetic selector 54. The circuit continues through the contact 90 of the magnetic selector and a wire 104 connecting the contact 90 to one end of a variable resistance 105. The movable arm of the variable resistance 105 is connected by a wire 106 to the negative line wire 74. Thus, this charging circuit includes the variable or adjustable resistance 105 which may be set to determine the charging time of this circuit.

When the arm 85 of the magnetic selector 54 is attracted and contact 90 engages contact 94, another charging circuit for the condenser including another variable resistance 107 is utilized for charging the condenser 79. This resistance is connected by a wire 108 to the wire 103 and the movable arm 109 thereof is connected to the wire 104. Under this condition the previously described charging circuit is broken at the contact 93 and contact 90 is directly connected to the wire 106 through the contact 94 which is, as shown, connected to wire 106. The charging circuit for the condenser 79 now includes wires 75, 100, condenser 79, wire 101, resistance 102, wire 108, variable resistance 107, arm 109, wire 104, contact 90, contact 94 and wire 106 to negative line wire 74. This charging circuit thus includes the variable resistance 107 which may be set to determine the rate of charging of the condenser 79.

Whichever of the two charging circuits is effective, the condenser is charged to a point where it breaks down the resistance of the neon tubes and the discharge passes through the coil 76c of the switch 76. The circuit through which this takes place includes a wire 110 connected to the wire 100 and one side of the two neon tubes 80 and 81 which are connected in series. The other side of the neon tubes is connected by a wire 111 to one side of the coil 76c and the other side of the coil 76c is connected by a wire 112 to the wire 101.

When the coil 76c is thus energized, it attracts the arm 76a which breaks the circuit to the coil 47c at the contact 76b and engages the contact 76d thereby closing a holding circuit for the coil 76c. This holding circuit includes wire 75, arm 76a, contact 76d, a wire 113 connected between contact 76d and wire 111, coil 76c, wire 112, wire 101, resistance 102 and one or the other of the circuits above described through resistances 105 or 107 back to the negative line wire 74 depending upon which contact is engaged by contact 90 of magnetic selector 54.

Upon the release of the pressure in the cylinder 17, switch arm 55a separates from contact 55b and the holding circuit to coil 76c is broken at this point as well as the circuit to coil 47c of switch 47. The arm 55a upon being released engages contact 55c. This contact is connected by a wire 114 to wire 103 and the charging circuits to the condenser are thus shunted.

The timing circuits including the electromagnetic switch 76, the neon tubes 80 and 81, the condenser 79, resistance 102, variable resistances 105 and 107 and a condenser 115 connected across the wires 77 and 106 are mounted in a box 116 that is secured to the table frame 1. Shafts for rotating the movable arms of the variable resistances 105 and 107 extend through the box and have knurled knobs 117 and 118 thereon. The box is illustrated attached to the table frame in Figures 1 and 3 and diagrammatically by the dotted line rectangle in Figure 11. The wires from the box 116 are connected to the circuit through a plug connector 119. This facilitates the removal and replacement of the timer.

In Figures 14 and 15 there is illustrated a connector block that includes a molded porcelain base 120 having two longitudinal shoulders 120a and 120b and a longitudinal projection 120c between and separating the shoulders. On the shoulder 120a there are two aligned electrical conductor strips 121 and 122, the opposed ends of which are separated and have a substantially concaved semicircular configuration. Between the separated ends of these strips is a circular boss 120d formed on the base slightly less in height than the thickness of the strips. A brass rod 123 having one portion 123a threaded and a portion 123b of lesser diameter unthreaded extends through an opening in the base through the center of the boss 120d. The hole is of a diameter to receive the portion 123b of the brass rod and the shoulder formed by the change in diameter abuts against the surface of the boss 120d. A nut 124 threaded on the rod 123 serves when screwed down to electrically connect the strips 121 and 122 and when raised away from these strips breaks the electrical connection. The hole through which the rod 123 extends is recessed radially forming two diametrically opposite recesses 120e into which part of the metal of the rod, in the upsetting operation described below, flows to form radial fins that prevent the rod from rotating. The strip 121 is secured to the base by a steel rivet 125 and the strip 122 is held to the base by a steel rivet 126. The assembly on the shoulder 120b of the base is, in all material respects, identical with that described on the shoulder 120a.

In assembling the connector block described above the strips are placed on the shoulder, the rivet 125 is inserted through the strip 121 and a hole in the base provided therefor. The strip 122 is likewise placed on the shoulder and the rivet 126 inserted through it and the base, and the rod 123 is inserted in the opening provided therefor. The parts on the shoulder 120b are likewise assembled and the block is then placed on the riveting machine. With this block a plate 125' is placed upon the plate 37 to cover the larger opening 37a through the plate 37. The plate 125' has an opening 125'a through which the rod 3 extends. The operator brings the rivet 126 into alignment with the rods 2 and 3 and presses the foot pedal 31. In the manner heretofore explained the rivet is headed. The pedal 31 is released, the rods 2 and 3 separate and the brass rod 123 is brought into alignment with the rods 2 and 3 when the pedal is again pressed. Upon the pressure switch 55 being closed the magnetic selector 54 operates as previously described to change the heating time to correspond with the electrical resistivity of the brass used. When this rod has been headed, the pedal 31 is again released and the rivet 125 is brought into alignment with the rods 2 and 3. Upon the opening of the primary circuit of the transformer 44 after the heading of the brass rod, the lever 85 of the magnetic selector is released and the timing circuit for a steel rivet is connected in circuit. Upon again pressing the pedal 31, the steel rivet 125 is headed, the magnetic selector not functioning. In the same manner, the parts assembled on the shoulder 120b are secured to the base.

From the foregoing description of the embodiment of the invention illustrated in the drawings, it will be seen that there is provided a way in which and a machine by which parts may be riveted to a frangible base without danger of breaking or fracturing the base, and by means of which an assembly requiring several different kinds of rivets may be completed without readjusting the machine.

It is important to note that while the machine described has been described as a machine for heading rivets, it includes all the essentials of a spot or resistance welding machine. In fact machines such as that disclosed have been used for spot welding.

It will be obvious that various changes may be made by those skilled in the art in the details of the invention as disclosed within the principle and scope of the invention as expressed in the appended claims.

I claim:

1. In a riveting machine of the type described the combination comprising means for exerting pressure on the ends of a rivet, means for passing an electric current through the rivet to heat the rivet, and control means therefor operative to cut off the current including a pair of control circuits, each circuit including means for cutting off the current after a predetermined interval, means for varying the time interval of each circuit, and means for selectively rendering said circuits effective in accordance with the current passing through the rivet.

2. In a riveting machine of the type described the combination comprising means for exerting pressure on the ends of a rivet, means for passing an electric current through the rivet to heat the rivet, and control means therefor operative to cut off the current including a pair of control circuits, each circuit including a condenser connected in circuit to be charged, a variable resistance to control the rate of charging of the condenser and a neon tube connected to pass the discharge of the condenser, and means operative in accordance with the current passing through the rivet for selectively rendering said circuits effective.

3. In a riveting machine of the type described, the combination comprising means for exerting pressure on the ends of a rivet, electrical heating means for passing an electric current through the rivet to heat the same, and control means therefor independent of said electrical heating means for varying the quantity of current passed through a rivet including a plurality of means each independently settable and operative to cut off the current of said electrical heating means after a predetermined time interval, and means operative in accordance with the current in the rivet circuit for selectively rendering said current cut off means effective.

4. In a riveting machine of the type described, the combination comprising means for exerting pressure on the ends of a rivet, electrical heating means for passing an electric current through the rivet to heat the same, and control means therefor independent of said electrical heating means for varying the quantity of current passed through a rivet including a plurality of control circuits each independently settable and operative to cut off the current of said electrical heating means after a predetermined time interval, and a relay in the rivet circuit for selectively rendering said current cut off means effective.

GEORGE H. PHELPS.